United States Patent
Palaniappan et al.

(10) Patent No.: US 7,468,149 B2
(45) Date of Patent: Dec. 23, 2008

(54) PROCESS FOR PREPARATION OF CONDUCTIVE POLYMER DISPERSION

(75) Inventors: Srinivasan Palaniappan, Andhra Pradesh (IN); Chellachamy Anbalagan Amarnath, Andhra Pradesh (IN)

(73) Assignee: Council of Scientific and Industrial Research, New Delhi (IN)

( * ) Notice: Subject to any disclaimer, the term of this patent is extended or adjusted under 35 U.S.C. 154(b) by 429 days.

(21) Appl. No.: 11/321,657

(22) Filed: Dec. 28, 2005

(65) Prior Publication Data
US 2007/0045590 A1 Mar. 1, 2007

(30) Foreign Application Priority Data
Aug. 26, 2005 (IN) .................... 2297/DEL/2005

(51) Int. Cl.
*H01B 1/12* (2006.01)
(52) U.S. Cl. ............... 252/500; 252/519.34; 429/337; 524/173; 525/54.1; 528/422
(58) Field of Classification Search ........... 252/500, 252/519.34; 429/337; 524/173; 525/54.1; 528/422
See application file for complete search history.

(56) References Cited

U.S. PATENT DOCUMENTS

| | | | |
|---|---|---|---|
| 4,403,055 A * | 9/1983 | Hungerford | 524/173 |
| 4,526,706 A * | 7/1985 | Upson et al. | 252/500 |
| 4,959,180 A * | 9/1990 | Armes et al. | 252/519.34 |
| 5,202,202 A * | 4/1993 | Nagai et al. | 429/337 |
| 5,240,644 A * | 8/1993 | Barry et al. | 252/500 |
| 5,519,111 A * | 5/1996 | MacDiarmid et al. | 528/422 |
| 5,720,903 A * | 2/1998 | Wessling et al. | 252/500 |
| 6,429,259 B1 * | 8/2002 | Yang et al. | 525/54.1 |
| 6,586,565 B2 * | 7/2003 | Palaniappan | 528/422 |
| 6,630,567 B1 * | 10/2003 | Palaniappan et al. | 528/422 |
| 2004/0089848 A1 * | 5/2004 | Palaniappan et al. | 252/500 |

* cited by examiner

*Primary Examiner*—Mark Kopec
*Assistant Examiner*—Khanh Tuan Nguyen
(74) *Attorney, Agent, or Firm*—Townsend and Townsend and Crew LLP

(57) ABSTRACT

The present invention provides a process for the preparation of conductive polymer dispersion. In the present invention the polymer is dispersed after its synthesis, hence dispersion contains only pure poly aniline salt and stabilizer. It therefore provides a pure poly aniline dispersion without any other contamination. More particularly, the purity of the dispersed poly aniline is achieved up 99% of initiator residue and monomer residue in the present invention. The present process provides a poly aniline dispersion in water, organic solvents and also in a mixture of solvents.

15 Claims, No Drawings

PROCESS FOR PREPARATION OF CONDUCTIVE POLYMER DISPERSION

CROSS-REFERENCES TO RELATED APPLICATIONS

This application claims the priority of Indian patent application 2297/DEL/2005/filed Aug. 26, 2005.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to a process for preparation of conductive polymer dispersion. More particularly, said process relates to preparation of poly aniline dispersion in water, in organic solvents and in mixture of solvents.

Barry et al., U.S. Pat. No. 5,240,644, prepared dispersion of polyaniline and its derivatives in the acidic aqueous reaction medium during polymerization using aromatic polyalkyleneoxides stabilizers. Aniline or its derivatives was oxidized by ferric chloride, persulfates or periodates oxidants in 1:1 molar ratio (oxidant to monomer) in presence of hydrochloric acid using polyalkyleneoxides stabilizers (monomer to stabilizer ratio is 1:5 w/w). Removal of low molecular weight compounds, residual aniline-hydrochloride salt, initiator and stabilizer from the reaction mixture are difficult. Excess amount of stabilizer (monomer to stabilizer ratio is 1:5 w/w) is used to get stable dispersion with particle size of 600 nm.

Yang et al., U.S. Pat. No. 6,429,259, disclosed the synthesis of water soluble polyaniline containing biopolymer complex, polyaniline-bovine serum albumin, polyaniline-human serum albumin in the reaction medium with no visual particles or precipitates. Aniline was oxidized by sodium persulfate oxidant in 1:1 molar ratio (monomer to oxidant) in presence of hydrochloric acid using bovine serum albumin, human serum albumin stabilizers (monomer to stabilizer ratio is 1:10 w/w). Polyaniline dispersion was isolated by dialysis and the dispersion was stable over 6 months. In this process, large amount of stabilizer (monomer to stabilizer ratio is 1:10 w/w) is utilized in the reaction medium.

Bay et al., (*Polymer*, 32, 2456, 1991) reported a process for preparation of polyaniline colloids using a copolymer poly (1-vinylimidazole-co-aminostyrene) stabilizer in the reaction medium (acidic aqueous medium) during polymerization. Aniline was oxidized by potassium iodate oxidant in 1:1 molar ratio (oxidant to monomer) in presence of hydrochloric acid using poly(1-vinylimidazole-co-aminostyrene) stabilizer (monomer to stabilizer ratio is 1:1 w/w). The obtained polyaniline particles showed a non-spherical 'rice-grain' morphology with particle size of 160 nm. The disadvantage of this process is the use of initiator potassium iodate, which was reduced to iodine ions and/or free iodine during the aniline polymerization. These by-products are usually incorporated in to the polyaniline colloids at relatively high levels (10-20 wt %).

Chattopadhyay et al., (*Langmuir* 14, 1544, 1998) utilized ethyl(hydroxyethyl) cellulose as stabilizer for dispersion polymerization of aniline in water as well as in aqueous alcohol medium. Aniline was oxidized by ammonium persulfate oxidant in 1:1 molar ratio (oxidant to monomer) in presence of hydrochloric acid using ethyl(hydroxyethyl) cellulose as stabilizer (monomer to stabilizer ratio is 1:2 w/w). Polyaniline dispersion was isolated by dialysis and the dispersion was stable for 2 months. The particle size of polyaniline dispersion was found to be 100-300 nm with tree like morphology.

Banerjee et al., (*Langmuir* 11, 2414, 1995) utilized poly (vinyl methyl ether) as stabilizer for polyaniline dispersion in aqueous or aqueous organic medium during polymerization. Aniline was oxidized by ammonium persulfate or potassium dichromate oxidant in 1:1 molar ratio (oxidant to monomer) in presence of hydrochloric acid using poly(vinyl methyl ether) as stabilizer (monomer to stabilizer ratio is 1:2.5 w/w). Poly (vinyl methyl ether) is unique stabilizer in the sense that it allows redispersion of the isolated polyaniline particles in both aqueous and organic media by virtue of being soluble in water and in number of organic solvents. The polyaniline dispersion was isolated by centrifuging the mixture and the dispersion was stable for two months. The particle size of polyaniline dispersion was 195 nm with oblong morphology.

S. P. Armes et al., (*Langmuir* 6, 1745, 1990) synthesized colloidal polyaniline dispersion in acidic aqueous solution using poly (2-vinylpyridine-co-p-aminostyrene) stabilizer. Aniline was oxidized by potassium periodate oxidant in 1:1 molar ratio (oxidant to monomer) in presence of hydrochloric acid using poly (2-vinylpyridine-co-p-aminostyrene) as stabilizer (monomer to stabilizer ratio is 1:1 w/w). The polyaniline was isolated by centrifuging the mixture and the dispersion in acidic aqueous medium was stable for one and a half months. The particle size of polyaniline dispersion was 150 nm with rice grain morphology.

Stejskal et al., (*Polymer* 40, 2487, 1999) synthesized polyaniline dispersion using hydroxypropylcellulose as stabilizer in acidic aqueous medium. Aniline was oxidized by ammonium persulfate oxidant in 1:1 molar ratio (oxidant to monomer) in presence of hydrochloric acid using hydroxypropylcellulose as stabilizer (monomer to stabilizer ratio is 1:2.5 w/w). Removal of low molecular weight compounds, residual aniline-hydrochloride salt, initiator and stabilizer from the reaction mixture are difficult. The free stabilizer remains in the dispersion even after dialysis and the dispersion was stable for one month. The particle size of polyaniline dispersion was 360 nm with spherical or coral like morphology.

The drawbacks of the above mentioned processes are (i) polyaniline dispersion is prepared in reaction medium during polymerization using stabilizer and the removal of low molecular weight compounds, residual aniline salt, initiator and stabilizer from the reaction mixture are difficult. (ii) polyaniline dispersion is isolated by dialysis or centrifuging the reaction mixture (ii) In some of the cases, higher amount of stabilizer is used in the preparation of polyaniline dispersion. (iii) Polyaniline dispersion is prepared mostly in aqueous-acid medium (dilute aqueous acid medium) or aqueous-organic medium.

Generally polyaniline salt decomposes without melting. As would be evident from the structures of these materials, the molecules are rather rigid and associated with high cohesive force. As a result, it is difficult, if not impossible, to process polyaniline by conventional polymer processing techniques, including molding and extrusion, which require softening or melting of the polymer or solubilizing the polymer. To overcome these problems and to improve tractability the inventors have prepared polyaniline dispersion in water and various organic solvents and/or mixture. A comparison table 2 is provided herewith to show the difference of the present processes available in prior art.

OBJECTIVES OF THE INVENTION

The main object of the present invention is to provide a process for the preparation of poly aniline dispersion using dry poly aniline salt powder.

Another object of the present invention is to provide a process for the preparation of poly aniline dispersion in water as well as in organic solvents and mixture of solvents.

BRIEF SUMMARY OF THE INVENTION

Poly aniline dispersion is prepared during polymerization and hence the removal of excess monomer, surfactant, oxidizing agent, acid etc is difficult one. However, in the present invention, the poly aniline is first prepared and then dispersed the polyaniline with the use of stabilizer. Purification of dispersion is not necessary because used polyaniline salt powder is washed with water and acetone while filtering bulk polymer powder (polymer is dispersed after its synthesis, hence dispersion contains only pure polyaniline salt and stabilizer). Hence, it is called pure dispersion without any other contamination. More particularly, the purity of the dispersed poly aniline is achieved up 99% of initiator residue and monomer residue in the present invention.

In view of the above, it will be seen that several advantages of the invention are achieved and other advantageous results attained. As various changes could be made in the above methods and compositions without departing from the scope of the invention, it is intended that all matter contained in the above description shall be interpreted as illustrative and not in a limiting sense.

BRIEF DESCRIPTION OF TABLE

Table 1 show polyaniline dispersion in various organic solvents and their stability Table 2 show the comparison between present invention with each prior art.

DETAILED DESCRIPTION OF THE INVENTION

Accordingly, the present invention provides a process for the preparation of polyaniline dispersion, the said process comprising the steps of:

a. dissolving dry polyaniline salt powder and a stabilizer separately in an organic polar solvent and mixing the above said solutions, under stirring, at ambient conditions, b. adding the above said solution mixture of step (a) to another polar solvent miscible with the solvent used in step (a) under stirring to obtain a polyaniline dispersion solution mixture, further adding another weak polar solvent miscible with the solvent used in the step (a) but immiscible with polar solvent, to the polyaniline dispersion solution mixture to remove the organic polar solvent used in the step (a) by known method to obtain the desired polyaniline dispersion in a polar solvent OR adding the above said solution mixture of step (a) to a weak polar solvent miscible with the solvent used in step (a) under stirring to obtain a polyaniline dispersion solution mixture and further adding another polar solvent miscible with the solvent used in the step (a) but immiscible with weak polar solvent to the above said polyaniline dispersion solution mixture to remove the organic polar solvent used in the step (a) by known method to obtain the desired polyaniline dispersion in a weak polar solvent, c. adding polyaniline dispersion in weak polar solvent obtained in step (b) to an organic solvent followed by evaporating the weak polar solvent from the resultant polyaniline dispersion mixture to obtain the desired polyaniline dispersion in organic solvent.

In an embodiment of the present invention the dry polyaniline salt powder used in step (a) is prepared by mixing dropwise solution of a dopant with aniline in emulsion of sodium lauryl sulfate with benzoyl peroxide.

In another embodiment the dopant used is selected from the group consisting of maleic acid, boron trifluoride ethyl etherate, fluoroboric acid, phthalic anhydride and maleic anhydride.

In yet another embodiment the organic polar solvent used in step (a) is selected from the group consisting of N,N-dimethyl formamide, N-methyl-2-pyrrolidone and dimethyl sulfoxide.

In yet another embodiment the stabilizer used in step (a) is selected from the group comprising of poly(vinyl alcohol), poly(vinylpyrrolidone), Sorbitan trioleate (span 85), polyoxy ethylene 20 sorbitane mono oleate (tween 80), nonyl phenol, polyvinyl methyl ether, epoxy resin and poly(ethylene glycol) bis(carboxylmethyl) ether.

In yet another embodiment the polar solvent used in step (b) is water.

In yet another embodiment the weakly polar solvent used in step (b) is selected from the group consisting of chloroform and dichloromethane.

In yet another embodiment the organic solvent used in step (c) is selected from the group consisting of decanol, m-cresol, 2-butoxy ethanol, n-propanol, isopropanol, isobutyl methyl ketone, N-methyl-2-pyrrolidone, dimethyl sulfoxide, epichlorohydrin and a mixture thereof.

In yet another embodiment the ambient temperature used in step (a) is in the range of 18 to 40° C.

In yet another embodiment time period used for mixing the two separate solutions of polyaniline salt powder and stabilizer in step (a) is in the range of 1 to 5 hours.

In yet another embodiment the weight ratio of polyaniline salt powder to stabilizer used in step (a), is in the range of 1:10 to 10:1.

In yet another embodiment the weight ratio of polyaniline salt powder to stabilizer used in step (a) is preferably 1:2.

In yet another embodiment the particle size of polyaniline dispersion in water obtained in step (b) is in the range of 130 to 200 nm.

In yet another embodiment polyaniline dispersion obtained in an organic solvent selected from the group consisting of decanol, m-cresol, 2-butoxy ethanol, n-propanol, isopropanol, isobutyl methyl ketone, N-methyl-2-pyrrolidone and dimethyl sulfoxide is stable for at least three months.

In still another embodiment the polyaniline dispersion obtained in a solvent selected from water and chloroform is stable for at least six months.

The novelty of the present invention lies in preparation of poly aniline dispersion in water as well as in organic solvents and mixture of solvents, free from low molecular weight compounds, excess stabilizer, monomer, initiator and other impurities by using poly aniline salt powder, instead of direct in situ preparation of poly aniline dispersion in presence of a monomer, stabilizer and initiator.

The following examples are given by way of illustration and therefore should not be construed to limit the scope of the present invention:

EXAMPLE 1

The following example illustrates the preparation of polyaniline salt powder. Sodium lauryl sulfate (1.0 g) is dissolved in 20 ml distilled water and mixed with a solution containing 3.0 g of benzoyl peroxide in 30 ml chloroform. The milky white emulsion thus formed is stirred at 35° C. Solution containing aniline (1 ml) and maleic acid (2.9 g) in 50 ml of water is added drop wise to the above mixture over a period of approximately 20 minutes. The reaction is allowed to proceed for 8 hours at 35° C. The color of emulsion at this time becomes green. The reaction mixture is separated into two layers, bottom oily green phase containing the polyaniline maleic acid salt and upper aqueous phase. The upper aqueous phase is removed by separating funnel and the oily green phase is added to the 300 ml acetone. The precipitated polyaniline powder (1.20 g) is filtered, washed with 500 ml distilled water and finally washed with 250 ml acetone. Using the above procedure, polyaniline salt systems are prepared by using the following variables instead of maleic acid.

(1) Boron trifluoride ethyl etherate (5 ml)
(2) Fluoroboric acid (5.5 ml)
(3) Maleic anhydride (2.45 g)
(4) Phthalic anhydride (3.33 g)

EXAMPLE 2

The following example illustrates the preparation of polyaniline dispersion in water. Polyaniline salt powder (100 mg) prepared using example 1 and poly(vinyl alcohol) (200 mg) are dissolved in 3 ml of N,N-dimethyl formamide separately, mixed both, stirred at ambient temperature for two hours. Then the mixture is added to 20 ml water and stirred for an hour. The above solution was transferred to separating funnel and 40 ml chloroform was added to remove N,N-dimethyl formamide from water. Thus obtained polyaniline dispersion in water is transparent to naked eyes with no visual particles or precipitates which is stable over six months.

Using the above procedure, polyaniline dispersion systems are prepared by using the following variables instead of poly(vinyl alcohol).

(1) Sorbitan trioleate (span 85),
(2) polyoxy ethylene 20 sorbitane mono oleate (tween 80).

EXAMPLE 3

The following example illustrates the preparation of polyaniline dispersion in chloroform. Polyaniline powder (100 mg) prepared using example 1 and poly(vinylpyrrolidone) (200 mg) are dissolved in 3 ml N,N-dimethyl formamide separately, mixed both, stirred at ambient temperature for two hours. Then the mixture was added to 15 ml chloroform and stirred for an hour. The above solution is transferred to separating funnel and 40 ml water is added to remove N,N-dimethyl formamide from the chloroform solvent. Thus obtained polyaniline dispersion in chloroform is transparent to naked eyes with no visual particles or precipitates which is stable over six months.

Using the above procedure, polyaniline dispersion systems are prepared by using the following variables instead of poly(vinylpyrrolidone).

(1) Sorbitan trioleate (span 85),
(2) polyoxy ethylene 20 sorbitane mono oleate (tween 80),
(3) Nonyl phenol (200 mg),
(4) Poly(vinyl methyl ether) (200 mg),
(5) Epoxy resin (200 mg),
(6) Poly(ethylene glycol) bis(carboxylmethyl) ether (200 mg).

EXAMPLE 4

The following example illustrates the preparation of the polyaniline dispersion in various organic solvents. Polyaniline dispersion in chloroform (5 ml) prepared using example 3 is added to 5 ml decanol. The solvent chloroform is evaporated using rotavapor and polyaniline dispersion is transferred to decanol. The polyaniline dispersion in decanol is transparent to naked eyes with no visual particles or precipitates.

Using the above procedure, polyaniline dispersion systems are prepared by using the following variables instead of decanol.

TABLE 1

Polyaniline dispersion in various organic solvents and its stability

| Solvents | Stability |
|---|---|
| Decanol | Above 3 months |
| m-Cresol | Above 3 months |
| 2-Butoxy ethanol | Above 3 months |
| n-Propanol | Above 3 months |
| Isopropanol | Above 3 months |
| Isobutyl methyl ketone | Above 3 months |
| N-methyl-2-pyrrolidone | Above 3 months |
| Dimethyl sulfoxide | Above 3 months |
| Epichlorohydrin | One month |
| Trigol | One week |
| Digol | One week |
| Poly(ethylene glycol) 200 | One week |
| Pyridine | One week |
| Chlorobenzene | No dispersion |
| Dichlorobenzene | No dispersion |
| Diethyl phthalate | No dispersion |
| Dioctyl phthalate | No dispersion |

EXAMPLE 5

The following example illustrates the preparation of polyaniline dispersion in mixture of solvents. Polyaniline dispersion in decanol (5 ml) prepared using example 4 is added to 5 ml of m-cresol. The polyaniline dispersion in mixture of solvents is transparent to naked eyes with no visual particles or precipitates. Similar procedure is used for other test solvents.

EXAMPLE 6

The following example illustrates the electronic absorption results of polyaniline dispersion in water as well as in hydrocarbon solvent. The polyaniline dispersion samples are analyzed by electronic absorption spectral technique using Hitachi U 2000 spectro-photometer. Electronic absorption spectra of polyaniline dispersion in water as well as in chloroform solvent according to example 2 and 3 are recorded and three peaks are observed at around 325-350, 450-525 and 700-825 nm, which corresponds to polyaniline salt system.

EXAMPLE 7

The following example illustrates the dynamic light scattering (DLS) results of polyaniline dispersion in water. The polyaniline dispersion samples are analyzed by dynamic light scattering technique using Malvern Instruments Ltd, Malvern UK. The particle size of polyaniline dispersion in water according to example 2 is recorded and particle size is found to be 200, 130, 170 nm when poly(vinyl alcohol), span 85, tween 80 used as stabilizers respectively.

miscible with the first polar solvent used in step (a) under stirring to obtain a second polyaniline dispersion; and
(c) further adding a less polar solvent miscible with the first polar solvent used in step (a) but immiscible with the second polar solvent used in step (b), to the second polyaniline dispersion solution mixture obtained in step

TABLE 2

Comparison table of the present invention with each prior art

| | Barry et al | Yang et al | Bay et al | Chattophadyaya et al | Banerjee et al | Stejskal et al | S. P. Armes et al | Present work |
|---|---|---|---|---|---|---|---|---|
| Initiator used and its ratio with monomer | $FeCl_3$, persulfates and periodates 1:1 | Sodium persulfate 1:1 | $KIO_3$ 1:1 | Ammonium persulfate 1:1 | Ammonium persulfate, $K_2Cr_2O_7$ 1:1 | Ammonium persulfate 1:1 | $KIO_3$ 1:1 | Benzoyl peroxide 1:1 |
| Stabilizer used and its ratio with monomer | Aromatic polyalkyene oxide 5:1 | Biopolymer; 10:1 | Copolymer A; 1:1 | EHEC; 1:1 | PVME; 2.5:1 | HPC; 2.5:1 | Copolymer B 1:1 | PVA, PVP, span 85, tween 80, etc; 2:1[a] |
| Solvent medium | Acidic aqueous | Acidic aqueous | Acidic aqueous | Water-ethanol | Water-ethanol | Acidic aqueous | Acidic aqueous | Water and organic solvents |
| Particle size | 600 nm | Not given | 60-360 nm | 300-100 nm | 195 nm | 360 nm | 150 nm | 130-200 nm |
| Particle shape | Not given | Not given | Rice grain | Tree like | Oblong | Rice grain | Rice grain | spherical |
| Conductivity | $ | Not given | $10^{-2}$ S/cm | 1-5 S/cm | 0.002-3.7 S/cm | 0.046 S/cm | 1 S/cm | $10^{-1}$ S/cm[b] |
| Purification method | Not purified | Dialysis | Not purified | Dialysis | Centrifuge | Not purified | Centrifuge | # |
| Stability | Not given | Six months | Not given | Not given | Not given | Not given | Not given | 3-6 months |

[a] 2:1 is stabilizer to polyaniline ratio (polymer is dispersed after its synthesis).
[b] conductivity of bulk dry polyaniline salt powder before dispersion.
$ Resistance - 12,000 ohms/sq
Purification of dispersion is not necessary because polyaniline salt powder used is washed with water and acetone while filtering bulk polymer powder (polymer is dispersed after its synthesis, hence dispersion contains only pure polyaniline salt and stabilizer).
EHEC—Ethyl (hydroxyethyl) cellulose
PVME—Polyvinyl methyl ether
HPC—Hydroxy propyl cellulose
PVA—Polyvinyl alcohol
Span 85—Sorbitan trioleate
Tween 80—Polyoxyethylene (20) sorbitane mono oleate
PVP—Polyvinyl pyrrolidone
$FeCl_3$—Ferric chloride
$KIO_3$—Potassium Iodate
$K_2Cr_2O_7$—Potassium dichromate
Biopolymer—Bovine serum albumin, human serum albumin
Copolymer A—poly(1-vinylimidazole-co-4-aminostyrene)
Copolymer B—poly(vinyl pyridine-co-p-aminostyrene)

The main advantages of the present invention are:
(1) Preparation of poly aniline dispersion using pure dry poly aniline salt powder.
(2) Preparation of poly aniline dispersion in water as well as in organic solvents and mixture of solvents.
(3) The poly aniline dispersion obtained from this method is pure, free from unreacted initiator, residual anilinium salt, and free from excess stabilizer (4).
(4) Preparation of poly aniline dispersion using less amount of stabilizer.

What is claimed is:
1. A process for the preparation of a polyaniline dispersion, the said process comprising the steps of:
 a. dissolving dry polyaniline salt powder and a stabilizer separately in a first organic polar solvent and mixing the above said solutions, under stirring, at ambient conditions, to obtain a first polyaniline dispersion in an organic solvent; and either
 b. adding the first polyaniline dispersion of step (a) to a second polar solvent, the second polar solvent being miscible with the first polar solvent used in step (a) under stirring to obtain a second polyaniline dispersion; and
 (b) to remove the organic polar solvent used in step (a) to obtain the desired polyaniline dispersion in the polar solvent used in step (b) OR
 (d) adding the first polyaniline dispersion of step (a) to a less polar solvent miscible with the solvent used in step (a) under stirring to obtain a fourth polyaniline dispersion;
 (e) further adding a second polar solvent, the second polar solvent being miscible with the first polar solvent used in step (a) but immiscible with the less polar solvent used in step (d) to the fourth polyaniline dispersion to remove the organic polar solvent used in step (a) to obtain a fifth polyaniline dispersion in the less polar solvent used in step (d); and
 (f) adding the fifth polyaniline dispersion in the less polar solvent obtained in step (e) to an organic solvent followed by evaporating the less polar solvent from the resultant polyaniline dispersion mixture to obtain the desired polyaniline dispersion in organic solvent.
2. A process as claimed in claim 1, wherein the dry polyaniline salt powder used in step (a) is prepared by mixing dropwise solution of a dopant with aniline in emulsion of sodium lauryl sulfate with benzoyl peroxide.

3. A process as claimed in claim 2, wherein the dopant used is selected from the group consisting of maleic acid, boron trifluoride, ethyl etherate, fluoroboric acd acid, phthalic anhydride and maleic anhydride.

4. A process as claimed in claim 1 wherein the first organic polar solvent used in step (a) is selected from the group consisting of N, N-dimethyl formamide, N-methyl-2-pyrrolidone and dimethyl sulfoxide.

5. A process as claimed in claim 1, wherein the stabilizer used in step (a) is selected from the group comprising of poly(vinyl alcohol), poly(vinylpyrrolidone), sorbitan trioleate (SPAN ® 85), polyoxyethvlene 20 sorbitan monooleate (TWEEN® 80), nonyl phenol, polyvinyl methyl ether, epoxy resin and poly(ethylene glycol) bis(carboxyl methyl) ether.

6. A process as claimed in claim 1, wherein the second polar solvent used in step (b) is water.

7. A process as claimed in claim 1, wherein the less polar solvent used in step (c) or (d) is selected from the group consisting of chloroform and dichioromethane.

8. A process as claimed in claim 1, wherein the organic solvent used in step (f) is selected from the group consisting of decanol, m-cresol, 2-butoxy ethanol, n-propanol, isopropanol, isobutyl methyl ketone, N-methyl-2-pyrrolidone, dimethyl sulfoxide, epichlorohydrin and mixtures thereof.

9. A process as claimed in claim 1, wherein the ambient temperature used in step (a) is in the range of 18 to 40° C.

10. A process as claimed in claim 1, wherein time period used for mixing the two separate solutions of polyaniline salt powder and stabilizer in step (a) is in the range of 1 to 5 hours.

11. A process as claimed in claim 1, wherein the weight ratio of polyaniline salt powder to stabilizer used in step (a), is in the range of 1:10 to 10:1.

12. A process as claimed in claim 1, wherein the weight ratio of polyaniline salt powder to stabilizer used in step (a) is preferably 1:2.

13. A process as claimed in claim 1, wherein the particle size of polyaniline dispersion in water obtained in step (b) is in the range of 130 to 200 nm.

14. A process as claimed in claim 1, wherein the polyaniline dispersion of step (f) is obtained in an organic solvent selected from the group consisting of decanol, m-cresol, 2-butoxy ethanol, n-propanol, isopropanol, isobutyl methyl ketone, N-methyl-2-pyrrolidone and dimethyl sulfoxide and wherein said polyaniline dispersion is stable for at least three months.

15. A process as claimed in claim 1, wherein the polyaniline dispersion is obtained in a solvent selected from water and chloroform and wherein said polyaniline dispersion is stable for at least six months.

* * * * *